US008570166B2

(12) United States Patent
Ge et al.

(10) Patent No.: US 8,570,166 B2
(45) Date of Patent: Oct. 29, 2013

(54) SYSTEM AND METHOD FOR ASSISTING DRIVER WHEN REVERSING MOTOR VEHICLE

(75) Inventors: Chi-Sheng Ge, New Taipei (TW); Chen-Huang Fan, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 216 days.

(21) Appl. No.: 13/210,384

(22) Filed: Aug. 16, 2011

(65) Prior Publication Data

US 2012/0050027 A1  Mar. 1, 2012

(30) Foreign Application Priority Data

Aug. 25, 2010 (CN) .......................... 2010 1 0262499

(51) Int. Cl.
*B60Q 1/00* (2006.01)
(52) U.S. Cl.
USPC ....................................................... 340/438
(58) Field of Classification Search
USPC ............. 340/438, 903, 932.2, 436, 463, 937, 340/435; 701/1
See application file for complete search history.

(56) References Cited

U.S. PATENT DOCUMENTS

| | | | | |
|---|---|---|---|---|
| 6,940,423 B2* | 9/2005 | Takagi et al. | ............... | 340/932.2 |
| 7,069,128 B2* | 6/2006 | Iwama | ............ | 701/36 |
| 7,706,944 B2* | 4/2010 | Tanaka et al. | ................ | 701/41 |
| 8,035,531 B2* | 10/2011 | Yoshihashi et al. | ........ | 340/932.2 |
| 8,049,778 B2* | 11/2011 | Kuboyama et al. | ............ | 348/118 |
| 8,339,253 B2* | 12/2012 | Chundrlik et al. | ............ | 340/436 |
| 2007/0182528 A1* | 8/2007 | Breed et al. | ................... | 340/435 |
| 2010/0013670 A1* | 1/2010 | Hueppauff et al. | ........ | 340/932.2 |

* cited by examiner

*Primary Examiner* — Phung Nguyen
(74) *Attorney, Agent, or Firm* — Altis & Wispro Law Group, Inc.

(57) ABSTRACT

An exemplary system for assisting a driver while reversing his or her car is used in conjunction with the car being fitted with a real-time information acquiring module to collect information concerning a road behind the car. The system includes a wireless communication device for wirelessly communicating with the real-time information acquiring module. The wireless communication device includes a detection module to detect movement information of the car, and a control module to compare the movement information with pre-stored standard parameter information. The standard parameter information can include the acceleration value of the car becoming zero, and a backward movement beginning within 20 seconds after the acceleration value becomes zero. The control module signals the real-time information acquiring module when the movement information matches the pre-stored standard parameter information. The wireless communication device further includes a display to display information of the road at the rear of the car.

7 Claims, 4 Drawing Sheets

SYSTEM AND METHOD FOR ASSISTING DRIVER WHEN REVERSING MOTOR VEHICLE

BACKGROUND

1. Technical Field

The present disclosure relates to a system and method for assisting a driver while reversing a motor vehicle such as a car.

2. Description of Related Art

It is often necessary to drive motor vehicles in reverse, for example, when parking. Some vehicles include a distance sensor, which ascertains the distance between the rear end of the vehicle and an obstacle. In addition, a display device is provided within the driver's field of vision, and displays the distance values determined by the distance sensor. The driver is then able to monitor the displayed distance values while reversing. Although the above system satisfies basic requirements, an improved system would provide additional peace of mind and safety for the driver when reversing his or her motor vehicle.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail with reference to the accompanying drawings.

Figure 1:
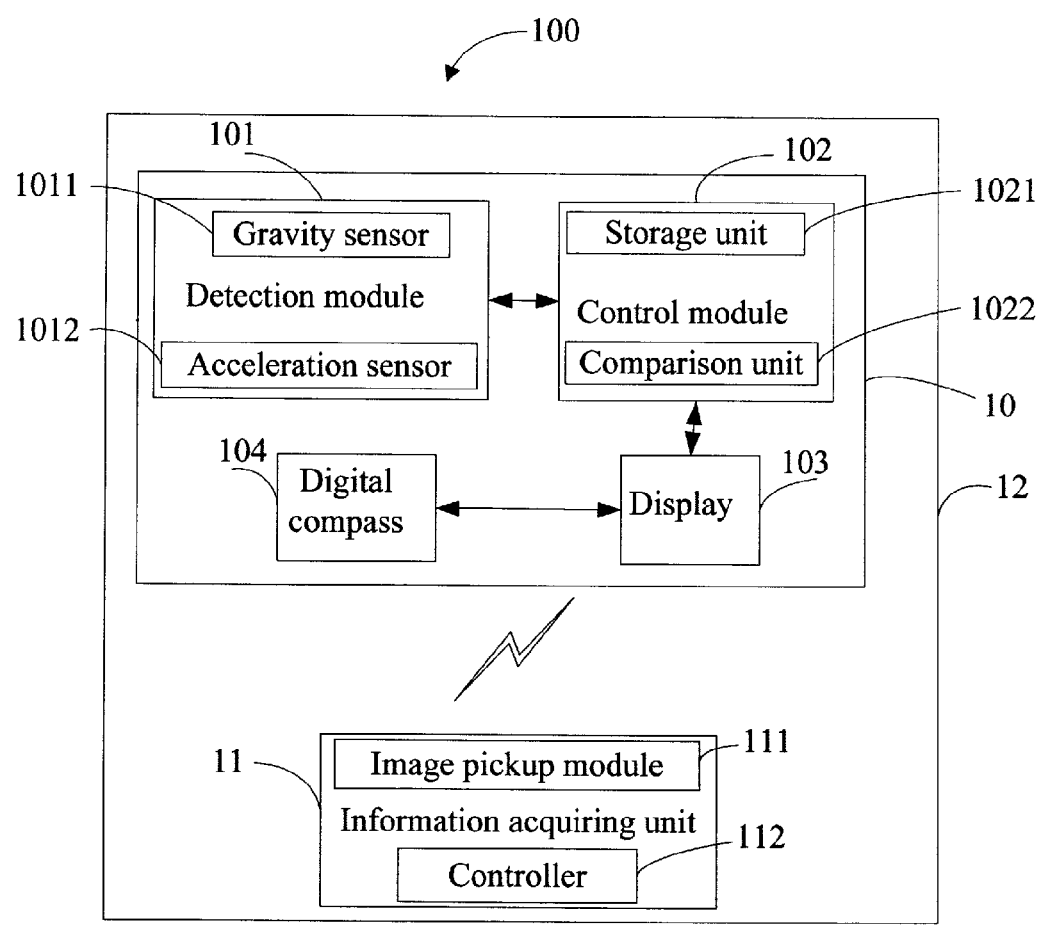
FIG. 1 is a block diagram of a system for assisting a driver while reversing his car according to an embodiment.
Figure 2:
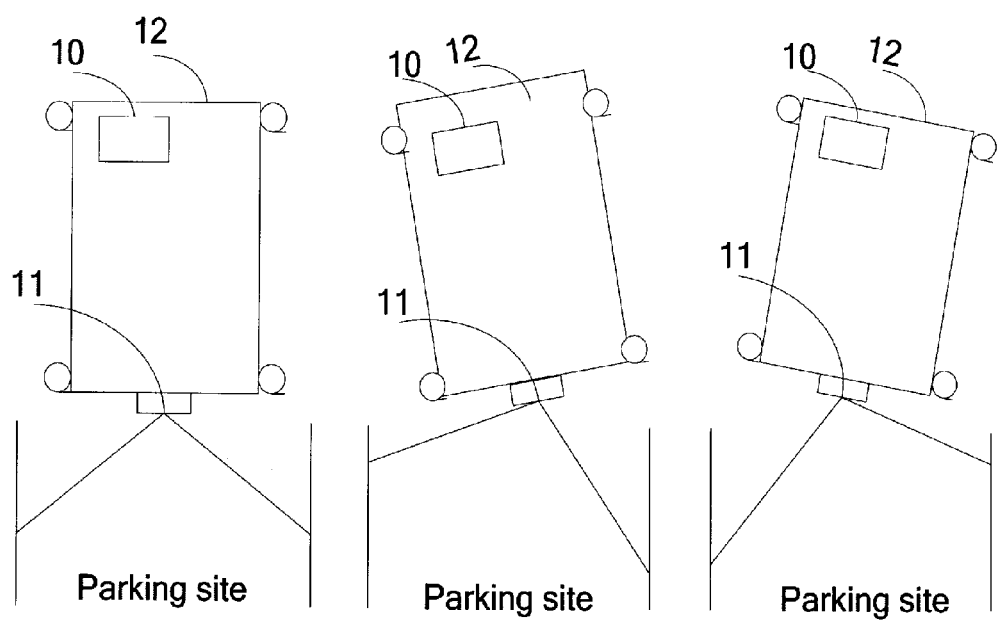
FIG. 2 is a schematic view showing three situations when the car is reversing into a parking site.

Referring to FIGS. 1 and 2, a system 100 for assisting a driver while reversing a motor vehicle such as a car 12 is provided. The system 100 includes a wireless communication device 10 and a real-time information acquiring unit 11. The wireless communication device 10 can be placed in a suitable location in the car 12 for ease of viewing by a driver. The real-time information acquiring unit 11 is mounted in the rear of the car 12. The wireless communication device 10 can wirelessly communicate with the real-time information acquiring unit 11.

The wireless communication device 10 includes a detection module 101, a control module 102, a display 103, and a digital compass 104. In the embodiment, the wireless communication device 10 can be a cell phone. The detection module 101 includes an acceleration sensor 1012 and a gravity sensor 1011. The acceleration sensor 1012 and the gravity sensor 1011 are respectively used to detect first movement information and second movement information. The first movement information can reflect the acceleration of the car 12, and the second movement information can reflect whether there is a backward movement in a preset time period after the car 12 becomes stationary.

The control module 102 includes a storage unit 1021 and a comparison unit 1022. The storage unit 1021 stores standard parameter information of the car 12 in reverse gear. In the embodiment, the standard parameter information includes the acceleration value of the car 12 becoming zero, and a backward movement beginning within 20 seconds after the acceleration value of the car 12 becomes zero. The comparison unit 1022 compares the first and second movement information with the standard parameter information, and determines that the car 12 is in reverse gear when they match. Having determined that the car is in reverse gear, the comparison unit 1022 signals the real-time information acquiring unit 11.

The digital compass 104 is used to detect directional information while the car 12 is moving, and can send this information (hereinafter, "turning information") to the real-time information acquiring unit 11.

Upon receiving the signal from the comparison unit 1022, the real-time information acquiring unit 11 actuates and starts to collect information concerning the state of the road at the rear of the car 12. In the embodiment, the information acquiring unit 11 includes an image pickup module 111 and a controller 112. The image pickup module 111 is used to take images of the road at the rear of the car 12. The controller 112 can receive the turning information from the digital compass 104 to control the image pickup module 111 to adjust its image pickup range and direction. The controller 112 also sends the data from the image pickup module 111 instantaneously to the wireless communication device 10. The images taken by the image pickup module 111 can then be displayed in real time on the display 103, thereby allowing the driver to monitor the road at the rear of the car 12 in real time.

Figure 3:
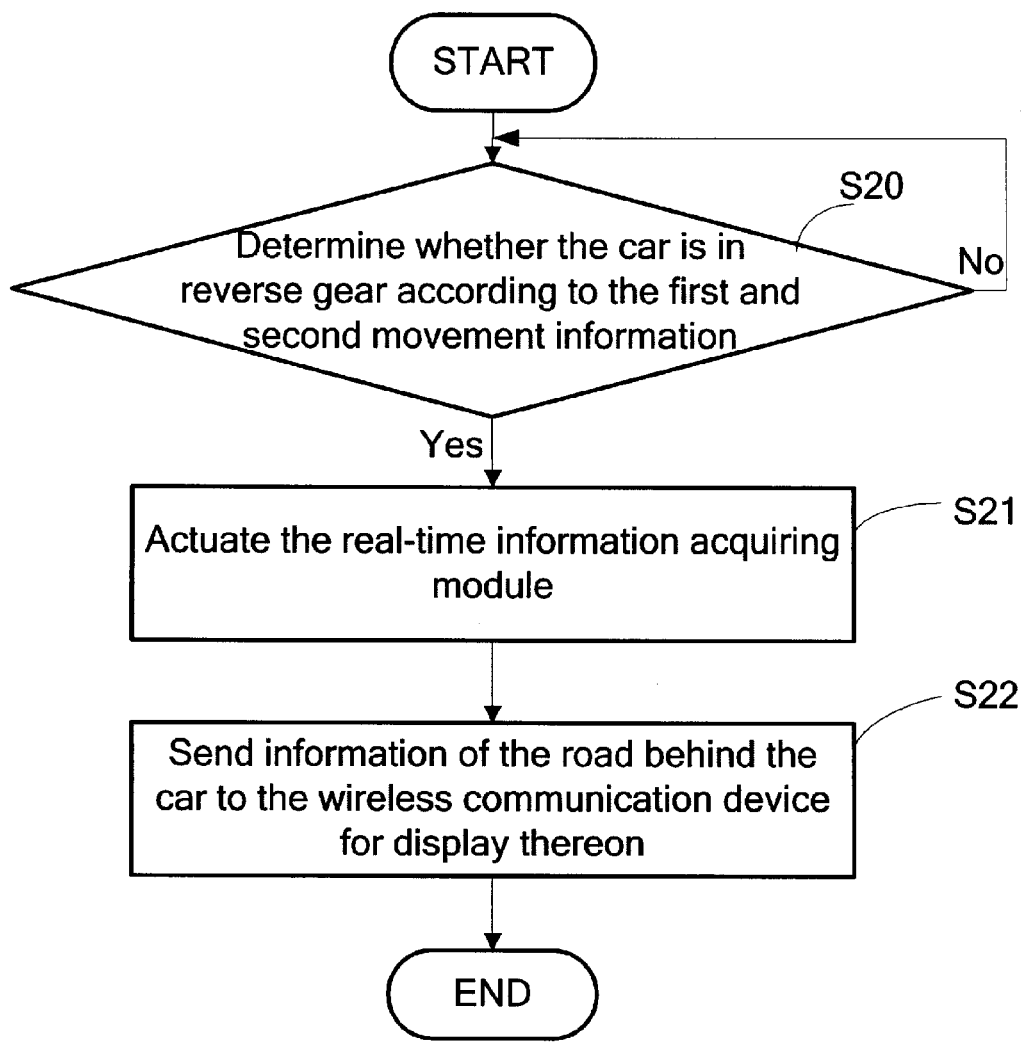
FIG. 3 is a flow chart of an exemplary method for assisting a driver while reversing a car.

FIG. 3 shows a flow chart of an exemplary method for assisting a driver while reversing the car 12. In step S20, the wireless communication device 10 detects the first and the second movement information of the car 12, and determines whether the car 12 is in reverse gear.

In step S21, when signaled by the wireless communication device 10, the real-time information acquiring unit 11 is actuated and starts to collect information concerning the road at the rear of the car 12. In step S22, the real-time information acquiring unit 11 sends the collected road information to the wireless communication device 10 for display.

Figure 4:
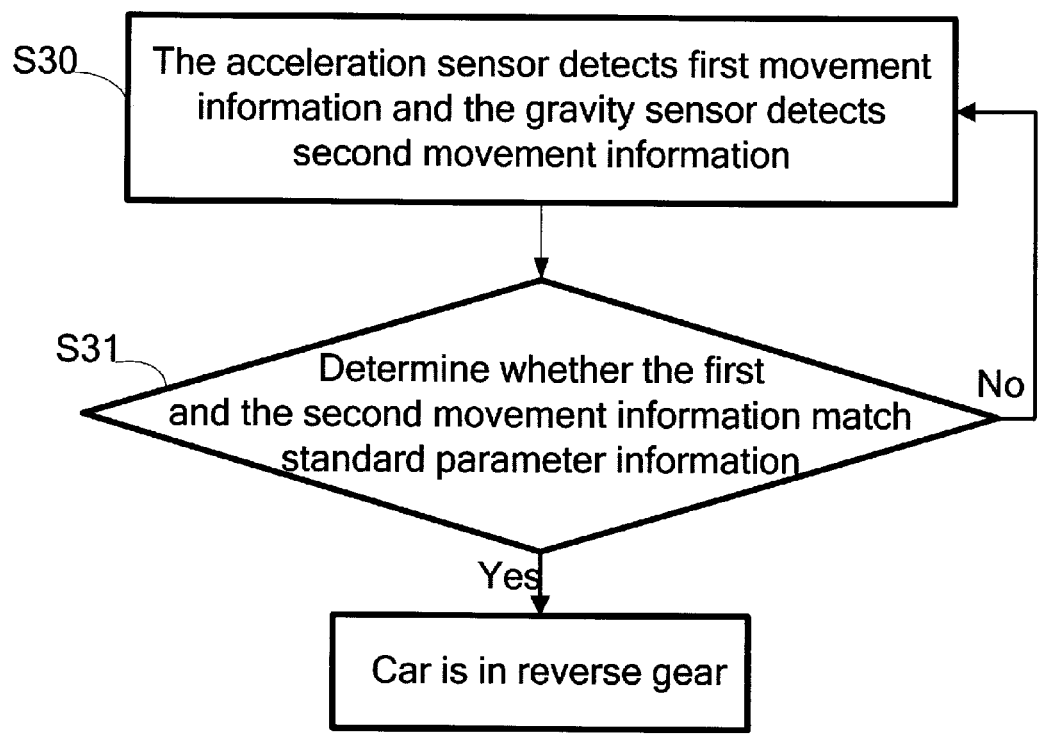
FIG. 4 is a flow chart of an exemplary method for determining whether the car is in reverse gear.

FIG. 4 shows a flow chart of an exemplary method for determining whether the car 12 is in reverse gear; that is, an exemplary method for carrying out step S20 above. In step S30, the acceleration sensor 1012 detects the acceleration (the first movement information) of the car 12. The gravity sensor 1011 detects if there is a backward movement within a preset time period after the acceleration value of the car becomes zero (the second movement information). In step S31, the comparison unit 1022 compares the first and the second movement information with the standard parameter information, and determines that the car 12 is in reverse gear if they match.

While various embodiments have been described and illustrated, the disclosure is not to be construed as being limited thereto. Various modifications can be made to the embodiments by those skilled in the art without departing from the true spirit and scope of the invention as defined by the appended claims.

What is claimed is:

1. A system for assisting a driver while reversing a motor vehicle, the motor vehicle comprising a real-time information acquiring module to collect information of a road at the rear of the motor vehicle, the system comprising:
  a wireless communication device configured for wirelessly communicating with the real-time information acquiring module, the wireless communication device comprising:
    a detection module configured to detect movement information of the motor vehicle;
    a control module configured to compare the movement information with pre-stored standard parameter information and to signal the real-time information acquiring module when the movement information matches the pre-stored standard parameter information, wherein the information of the road at the rear of the motor vehicle collected by the real-time information acquiring module is capable of being wirelessly sent to the wireless communication device; and
    a display configured to display the information of the road at the rear of the motor vehicle received from the real-time information acquiring module;
    wherein the detection module comprises an acceleration sensor and a gravity sensor, the acceleration sensor is configured to detect the acceleration of the motor vehicle, the gravity sensor is configured to detect if there is a backward movement of the motor vehicle in a predetermined time period after the acceleration of the motor vehicle becomes zero.

2. The system according to claim 1, wherein the control module comprises a storage unit and a comparison unit, the storage unit stores the standard parameter information, and the comparison unit is configured to compare the movement information with the standard parameter information.

3. The system according to claim 1, wherein the wireless communication device further comprises a digital compass to detect turning information reflecting whether the motor vehicle turns, the turning information is capable of being sent to the real-time information acquiring module, and the real-time information acquiring module is configured to collect the information of the road at the rear of the motor vehicle based on the turning information.

4. A method for assisting a driver to navigate while moving a motor vehicle in reverse, the method utilizing a wireless communication device, the motor vehicle comprising a real-time information acquiring module to collect information of a road at the rear of the motor vehicle, the method comprising:
  detecting movement information of the motor vehicle via the wireless communication device;
  determining whether the motor vehicle is in reverse gear according to the movement information; and
  actuating the real-time information acquiring module when the motor vehicle is in reverse gear, and sending the information of the road at the rear of the motor vehicle to the wireless communication device for display by the wireless communication device;
  wherein the wireless communication device comprises an acceleration sensor and a gravity sensor to detect the movement information, the acceleration sensor is configured to detect the acceleration of the motor vehicle, and the gravity sensor is configured to detect if there is a backward movement of the motor vehicle in a predetermined time period after the acceleration of the motor vehicle becomes zero.

5. The method according to claim 4, wherein the wireless communication device comprises a control module configured to compare the movement information with pre-stored standard parameter information, and determine that the motor vehicle in reverse gear when the movement information matches the pre-stored standard parameter information.

6. The method according to claim 4, wherein the wireless communication device further comprises a digital compass to detect turning information reflecting whether the motor vehicle turns, and the method further comprises sending the turning information to the real-time information acquiring module, and the real-time information acquiring module collecting the information of the road at the rear of the motor vehicle based on the turning information.

7. A motor vehicle comprising:
  a real-time information acquiring module to collect information of a road at the rear of the motor vehicle
  a wireless communication device configured for wirelessly communicating with the real-time information acquiring module, the wireless communication device comprising:
    an acceleration sensor and a gravity sensor, the acceleration sensor being configured to detect the acceleration of the motor vehicle, the gravity sensor being configured to detect if there is a backward movement of the motor vehicle in a predetermined time period after the acceleration of the motor vehicle becomes zero;
    a control module configured to signal the real-time information acquiring module when there is a backward movement of the motor vehicle in a predetermined time period after the acceleration of the motor vehicle becomes zero, wherein the information of the road at the rear of the motor vehicle collected by the real-time information acquiring module is capable of being wirelessly sent to the wireless communication device; and
    a display configured to display the information of the road at the rear of the motor vehicle received from the real-time information acquiring module.

* * * * *